United States Patent
Bole

[15] 3,663,983
[45] May 23, 1972

[54] LENS BLOCKING APPARATUS

[72] Inventor: Hamilton B. Bole, Sturbridge, Mass.
[73] Assignee: American Optical Corporation, Southbridge, Mass.
[22] Filed: June 5, 1970
[21] Appl. No.: 43,684

[52] U.S. Cl. ..................................51/277, 18/5 D, 51/284
[51] Int. Cl. .......................................................B24b 19/00
[58] Field of Search ..............................51/277, 284; 18/5 D

[56] References Cited

UNITED STATES PATENTS

| | | | |
|---|---|---|---|
| 3,257,686 | 6/1966 | Merker et al. | 18/5 D |
| 3,507,076 | 4/1970 | Rudd et al. | 51/277 |
| 2,081,936 | 6/1937 | Keenan | 51/277 |
| 3,277,612 | 10/1966 | Brandt | 51/277 |
| 3,337,659 | 8/1967 | Grandperret | 51/284 |
| 3,468,366 | 9/1969 | Suddarth | 51/277 |

Primary Examiner—William R. Armstrong
Attorney—William C. Nealon, Noble S. Williams and Robert J. Bird

[57] ABSTRACT

Apparatus for molding a lens block directly upon one side of a lens blank for use in conjunction with other apparatus for performing manufacturing operations upon the blank. The blocking apparatus comprises, in general, an axially rotatable disc upon one side of which a number of block-forming molds are disposed adjacent its periphery. The molds each have one open side against which a lens blank is clamped and a lateral opening through which a suitable blocking material may be introduced into the mold at a blocking station. The blocking station is reached by rotatably indexing the disc until alignment of a particular mold therewith is accomplished. Lens aligning indecia associated with each block-forming mold are illuminated at the block-forming station so as to facilitate centering and cylinder axis alignment of a particular lens blank relative to a block to be formed thereon at the molding station.

5 Claims, 6 Drawing Figures

Patented May 23, 1972

INVENTOR.
HAMILTON B. BOLE

BY Noble T. Williams
ATTORNEY

Patented May 23, 1972 3,663,983

INVENTOR.
HAMILTON B. BOLE
BY Noble T. Williams
ATTORNEY 3,663,983

LENS BLOCKING APPARATUS

BACKGROUND OF THE INVENTION

1. Field of the Invention

Lens blocking apparatus with particular reference to apparatus for molding blocks upon ophthalmic lens blanks for use in the performance of lens edge finishing operations.

2. Description of the Prior Art

In ophthalmic optics, finished prescriptive lenses have two different kinds of centers, geometric centers and optical centers. While these centers may occasionally coincide, they are determined differently. The geometric center, often referred to as the mechanical center, is the geometrical midpoint of the finished lens shape and it is the point about which a lens blank must be revolved during edge finishing operations. The optical center is the point on a lens were the prism power is zero and it is physically located on the finished lens by a line through the centers of curvature of the front and back surfaces.

With the advent of molded lens blocks wherewith substantial cost reductions in lens edge finishing operations requiring blocking to the mechanical center have been realized, there is the corollary requirement for greater economy in apparatus used to effect the block molding operations. This is the crux of the present invention wherein simplification of the blocking apparatus has been accomplished.

SUMMARY OF THE INVENTION

The present invention achieves exceptional economy and simplicity in lens blocking apparatus and operations used to prepare lens blanks for edge finishing through the provision of a block molding station relative to which a plurality of blocking molds are selectively successively indexed for receiving both a lens blank to be blocked and material for forming the block. The apparatus includes lens aligning indecia which become automatically illuminated with the positioning of each mold at the blocking station and wherewith accurate alignment of a lens blank placed upon a particular mold for blocking is accomplished. The apparatus further includes simple, inexpensive, yet highly efficient spring clamping means with which lens blanks to be blocked are clamped to respective blocking molds and securely retained in desired aligned relationships with the molds during formation of the blocks. Also featured in the present invention is the adaptability of the blocking apparatus to various forms of blocking material dispensers and/or hand pouring operations, should the latter be necessitated.

Details of the invention will become readily apparent from the following description when taken in conjunction with the accompany drawings.

DESCRIPTION OF THE PREFERRED EMBODIMENT

Referring more particularly to the drawings, it can be seen that lens blocker 10 is detachably connectable to a blocking material dispenser 12 which, in not forming a part of the present invention, is shown with dot-dash outline.

Figure 4:
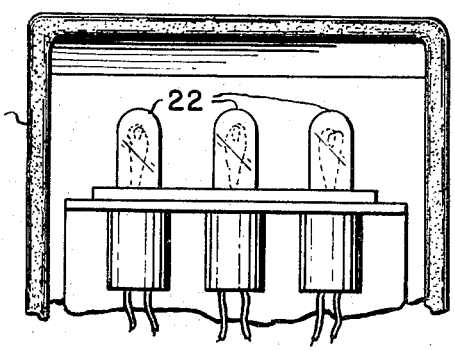
FIG. 4 is a fragmentary front elevational view of the station in the apparatus at which lenses are blocked.

Blocker 10 includes main supporting structure 14 having base 16 which renders the blocker self-supporting when placed upon a workbench or the like. A clamping screw 18 associated with base 16 may, however, be used for effecting secure attachment of the blocker to associated equipment such as, for example, blocking material dispenser 12. Structure 14 has housing 20 which extends upwardly from base 16 within which three electrical lamps 22 (FIGS. 2 and 4) are supported adjacent its uppermost end. Housing 20 also supports rotary disc 24.

Disc 24 carries a plurality of blocking molds 26 (e.g. three in number) which are equally radially spaced from the disc axis and disposed adjacent the periphery of the disc. Molds 26 are selective individually positionable at a lens blocking station 28 over the centermost of lamps 22 by rotation of disc 24 about its axis in journeling 30 (FIG. 2).

Figure 2:
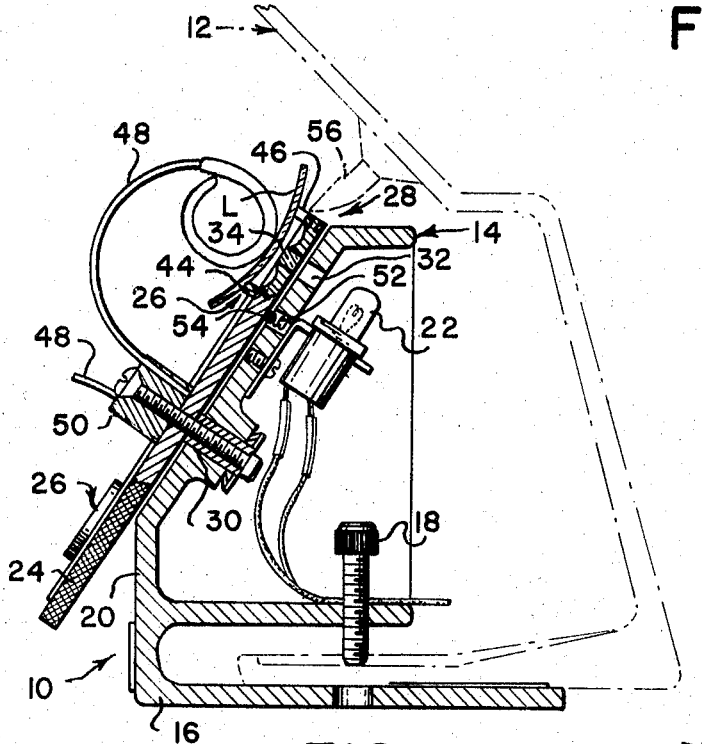
FIG. 2 is a vertical cross-sectional view taken generally along line 2—2 of FIG. 1.
Figure 3:
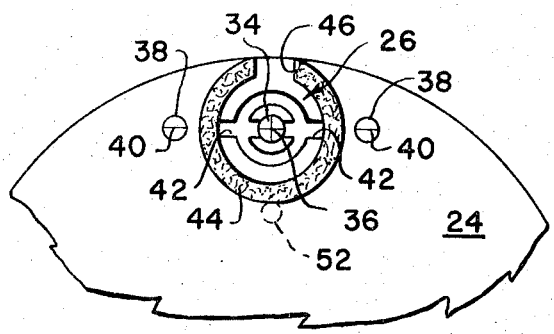
FIG. 3 is a fragmentary rear elevational view of the blocking apparatus.

At blocking station 28, apertures 32 (one of which is shown in FIG. 2) disposed forwardly of each of lamps 22 permit the passage of light through housing 20 to disc 24. Within each blocking mold 26 on disc 24 there is centered transparent plug 34 through which light from the centermost lamp 22 is transmitted into the base of mold 26. This plug 34 is provided with opaque indecia 36 (FIG. 3) preferably in the form of a "cross hair" which is used for centering a lens blank over mold 26 in the operation of blocker 10 which will be described in greater detail hereinafter.

In line with plug 34 at each of opposite sides thereof, outside of each of molds 26, additional transparent plugs 38, adopted to become aligned with the outermost lamps 22, are extended through disc 24. Plugs 38 have indecia 40 in the form of straight lines which are used to align the cylinder axis of a lens blank preparatory to blocking.

Molds 26 each comprise a cavity extending partially into disc 24 wherein laterally extending recesses 42, aligned with cross hair 36 and indecia 40 are provided for forming tang portions of blocks respectively molded in each of molds 26. The extensions of these cavities above the surface of disc 24 are each formed by a ring 44 of gasket material against which a lens blank L to be blocked is placed so as to complete the enclosure of the cavity. A lateral opening 46 through each ring 44 permits the pouring of block forming material into the otherwise closed cavity.

Figure 1:
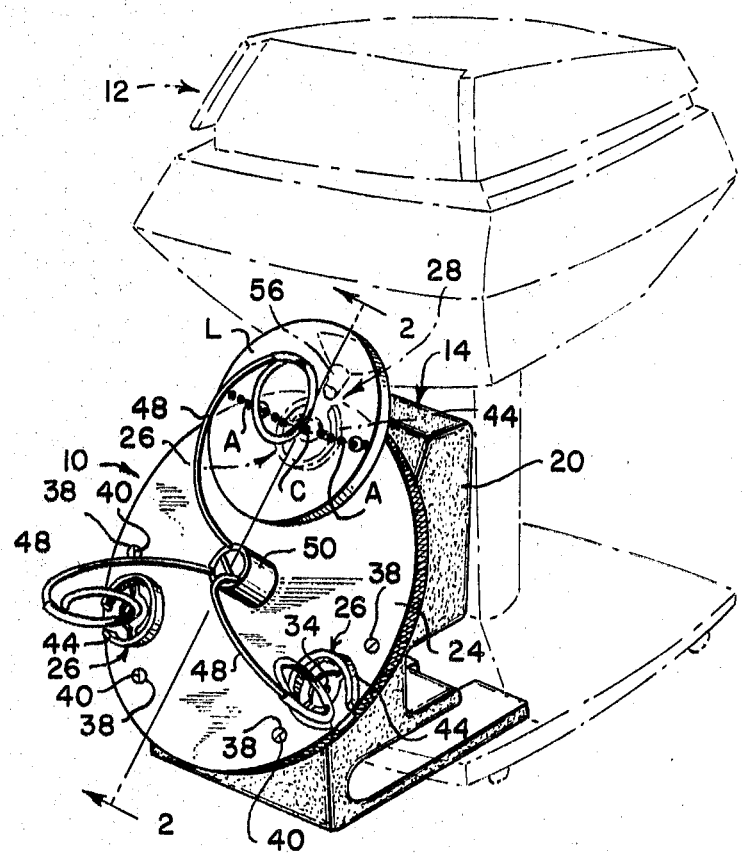
FIG. 1 is an illustration, in perspective, of lens blocking apparatus embodying the present inventive concept.

Partially coiled spring wires provided clamps 48 which resiliently retain a lens blank L in a desired aligned relationship upon a particular lens blocking mold 26 in the manner illustrated in FIGS. 1 and 2. Wire clamps 48 extend from hub 50 of disc 24 which rotates in unison with the disc.

Each of blocking molds 26 is adapted to be accurately automatically centered over the centermost of lamps 22 at the lens blocking station 28 by the provision of a conventional spring detent 52 (FIG. 2) which engages indentations 54 in disc 24, the indentations 54 being appropriately positioned for such centering of the molds 26 at station 28.

OPERATION OF THE BLOCKER

Figure 5:
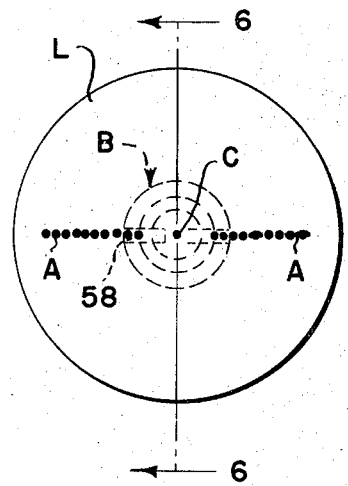
FIG. 5 is a plan view of a blocked lens blank having center and cylinder axis markings thereon which are exemplary of those used in aligning lens blanks for blocking according to the present invention.

A lens blank L requiring blocking for the performance of subsequent manufacturing operations thereon (e.g. edge finishing) and having the well-known markings indicating mechanical center C and cylinder axis A—A as shown in FIGS. 1 and 5, for example, is placed under clamp 48 upon the gasket 44 of a particular blocking mold 26. At this point, the selected blocking mold 26 may have been previously indexed to lens blocking station 28 or moved to such position following attachment of lens blank L thereto.

In either case, once at lens blocking station 28, the lens blank is adjusted on ring 44 to a position where its mechanical center C is accurately centered upon the illuminated image of cross hair 36 with its cylinder axis A—A accurately oriented into alignment with indecia 40; it being understood that the transparent material of lens blank L will permit sighting of the illuminated indecia 36 and 40 therethrough.

The foregoing alignment of lens blank L having been effected, a suitable block forming material such as a metallic alloy of the type commonly sued for this purpose is poured through opening 46 into the otherwise closed cavity of blocking mold 26, one side of which comprises the surface of lens blank L which extends over ring 44. The pouring of a suitable block forming material may be accomplished with a dispensing nozzle 56 of a suitable dispenser 12 as illustrated in FIGS. 1 and 2 or, alternatively, by any suitable similar means including a hand ladle.

Figure 6:
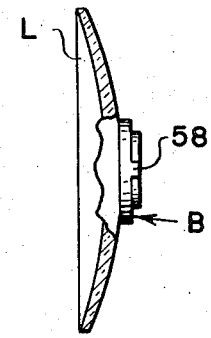
FIG. 6 is a cross-sectional view taken generally along line 6—6 of FIG. 5.

The block (FIGS. 5 and 6) thus formed in attached relationship to lens L within mold 26 is allowed to cool sufficiently for removal intact with lens L while a second and/or third lens blank may be similarly processed, i.e. blocked, by suitable indexing of disc 24 relative to blocking station 28.

As pointed out hereinabove, alignment of the cylinder axis A—A of a particular lens blank L with indecia 40 prior to performance of the blocking operation automatically aligns the lens blank cylinder axis with recesses 42 in the mold cavity. These recesses form tangs 58 of block B which are used in the manner well-known to the artisan for properly orienting and retaining the lens blank in a lens edge finishing machine used to grind the lens blank to a contour shape and size suitable for mounting in a prescribed spectacle frame.

Those interested in details concerning the use of lens blocks such as have been described hereinabove in lens processing apparatuses may refer to U.S. Pat. Nos. 3,195,197, 3,257,686 and 3,277,612.

I claim:
1. Lens blocking apparatus comprising:
   a main supporting structure having a base and upstanding housing;
   lighting means within said housing adjacent the uppermost end thereof, said end of the housing having provision for the passage of light therethrough and establishing a station for performing blocking operations in said apparatus;
   a mold carrying disc having a number of lens blocking molds adjacent its periphery, said molds each having an internal block-forming cavity, said disc being axially rotatable on said main supporting structure for moving said molds into alignment with and away from said blocking station; and
   a spring clamp associated with each of said blocking molds externally of respective block-forming cavities thereof for releasably holding a lens blank against the blocking mold whereby a portion of a surface of the blank disposed within the block-forming cavity in each case completes the formation of said block-forming cavity permitting a block to be formed to the size and shape of the cavity in attached relationship to said lens blank by the introduction of block-forming material into the cavity, each blocking mold having a lateral opening communicating with said cavity through which said material may be introduced thereinto.
2. Lens blocking apparatus according to claim 1 including light-conducting means disposed centrally within and at diametrically opposite sides of each of said lens blocking molds, said light-conducting means having indecia for use in aligning a lens blank relative to said block-forming cavity of the mold and said indecia being adapted to be illuminated to facilitate said alignment of the lens blank by said lighting means when said mold is positioned at said blocking station.
3. Lens blocking apparatus comprising:
   a main supporting structure having a base and upstanding housing;
   lighting means within said housing adjacent the uppermost end thereof, said end of the housing having provision for the passage of light therethrough and establishing a station for performing blocking operations in said apparatus;
   a mold carrying disc having a number of lens blocking molds adjacent its periphery, said molds each having an internal block-forming cavity and said disc being axially rotatable on said main supporting structure for moving said molds into alignment with and away from said blocking station;
   light-conducting means comprising plugs of transparent plastic material extending through said mold carrying disc, one centrally within and one at each of diametrically opposite sides of each of said lens blocking molds, said plug disposed centrally within said mold having indicia in the form of a cross for centering lens blanks thereover and remaining transparent plugs having indicia aligned with said cross for use in orienting cylinder axes of said lens blanks relative to respective mold cavities; and
   a spring clamp associated with each of said blocking molds externally of respective block-forming cavities thereof for releasably holding a lens blank against the blocking mold whereby a portion of a surface of the blank disposed within the block-forming cavity in each case completes the formation of said block-forming cavity permitting a block to be formed to the size and shape of the cavity in attached relationship to said said lens blank by the introduction of block-forming material into the cavity, each blocking mold having a lateral opening communicating with said cavity through which said material may be introduced thereinto.
4. Lens blocking apparatus according to claim 1 wherein said clamp in each case comprises a length of partially coiled spring wire having one end fixed in said disc and its opposite end free to effect said holding action.
5. Lens blocking apparatus according to claim 3 wherein said spring clamp in each case comprises a length of partially coiled spring wire having one end fixed approximately centrally in said disc and extending radially arcuately therefrom to a point approximately centrally over a respective one of said blocking molds, said free end of said wire being relatively tightly coiled and spring biased against said mold for effecting said holding of a lens blank placed between said free end and the blocking mold.

* * * * *